United States Patent
Bendlin et al.

(10) Patent No.: US 10,091,662 B1
(45) Date of Patent: Oct. 2, 2018

(54) CUSTOMER PREMISES EQUIPMENT DEPLOYMENT IN BEAMFORMED WIRELESS COMMUNICATION SYSTEMS

(71) Applicant: AT&T Intellectual Property I, L.P., Atlanta, GA (US)

(72) Inventors: Ralf Bendlin, Cedar Park, TX (US); Saeed Ghassemzadeh, Austin, TX (US); Aditya Chopra, Austin, TX (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/783,851

(22) Filed: Oct. 13, 2017

(51) Int. Cl.
| | |
|---|---|
| H04W 40/00 | (2009.01) |
| H04W 16/18 | (2009.01) |
| H04W 64/00 | (2009.01) |
| H04W 24/10 | (2009.01) |
| H04W 16/28 | (2009.01) |

(52) U.S. Cl.
CPC ........... *H04W 16/18* (2013.01); *H04W 24/10* (2013.01); *H04W 64/003* (2013.01); *H04W 16/28* (2013.01)

(58) Field of Classification Search
CPC ... H04W 16/18; H04W 24/10; H04W 64/003; H04W 16/28
USPC ...... 455/446, 450, 67.11, 452.1, 63.1, 562.1, 455/575.7
See application file for complete search history.

(56) References Cited

U.S. PATENT DOCUMENTS

| | | |
|---|---|---|
| 6,269,092 B1 | 7/2001 | Schilling |
| 6,711,204 B2 | 3/2004 | Schilling |
| 8,179,824 B2 | 5/2012 | Seong et al. |
| 8,289,863 B2 | 10/2012 | Vook et al. |

(Continued)

FOREIGN PATENT DOCUMENTS

| | | |
|---|---|---|
| CN | 104507108 A1 | 4/2015 |
| EP | 2819454 A1 | 12/2014 |

(Continued)

OTHER PUBLICATIONS

"Making 5G NR a Reality", Qualcomm®, qualcomm.com, accessed Aug. 2017. 30 Pages.

(Continued)

*Primary Examiner* — Marceau Milord

(57) ABSTRACT

An example method may include a processing system of a device having a processor capturing, at a first position comprising a first location and a first spatial orientation of the device, a first measurement of a performance indicator based upon at least a first wireless signal from a base station of a beamformed wireless communication network and capturing, at a second position comprising a second location and a second spatial orientation of the device, a second measurement of the performance indicator based upon at least a second wireless signal from the base station of the beamformed wireless communication network. The method may include the processing system selecting a position for a deployment of the device based upon the first measurement of the performance indicator and the second measurement of the performance indicator and providing at least one instruction for the deployment of the device at the position that is selected.

20 Claims, 4 Drawing Sheets

(56) References Cited

U.S. PATENT DOCUMENTS

| | | | |
|---|---|---|---|
| 8,351,411 B2 | 1/2013 | Kim et al. | |
| 8,463,298 B2 | 6/2013 | Kim et al. | |
| 8,531,937 B2 | 9/2013 | Levy | |
| 8,565,673 B2 | 10/2013 | Hu | |
| 8,599,945 B2 | 12/2013 | Sampath | |
| 8,655,348 B2 | 2/2014 | Zha et al. | |
| 8,660,015 B2 | 2/2014 | Issakov et al. | |
| 8,675,575 B2 | 3/2014 | Gong et al. | |
| 8,681,727 B2 | 3/2014 | Kinnunen et al. | |
| 8,831,125 B2 * | 9/2014 | Wernersson | H01Q 3/00 375/242 |
| 8,873,408 B2 | 10/2014 | Siomina et al. | |
| 8,971,294 B2 | 3/2015 | Yan et al. | |
| 8,995,563 B2 | 3/2015 | Cho et al. | |
| 9,124,395 B2 | 9/2015 | Lin et al. | |
| 9,258,040 B2 | 2/2016 | Levy | |
| 9,264,928 B2 | 2/2016 | Liu et al. | |
| 9,270,438 B2 | 2/2016 | Lee et al. | |
| 9,295,044 B2 | 3/2016 | Novak et al. | |
| 9,300,495 B2 | 3/2016 | Dahlman et al. | |
| 9,307,544 B2 * | 4/2016 | Gore | H04B 1/7143 |
| 9,326,916 B2 * | 5/2016 | Tollman | B65D 47/2031 |
| 9,331,386 B2 * | 5/2016 | Wernersson | H01Q 3/00 |
| 9,332,443 B2 | 5/2016 | Xiao et al. | |
| 9,351,288 B2 | 5/2016 | Pi | |
| 9,351,315 B2 | 5/2016 | Bao et al. | |
| 9,414,371 B2 | 8/2016 | Pi et al. | |
| 9,420,584 B2 | 8/2016 | Blankenship et al. | |
| 9,439,086 B2 | 9/2016 | Emmanuel et al. | |
| 9,444,531 B2 | 9/2016 | Levy | |
| 9,444,596 B2 | 9/2016 | Chung et al. | |
| 9,455,772 B2 | 9/2016 | Zhang et al. | |
| 9,473,226 B2 | 10/2016 | Shattil | |
| 9,473,967 B2 | 10/2016 | Zhang et al. | |
| 9,496,609 B2 | 11/2016 | Marshall et al. | |
| 9,497,047 B2 | 11/2016 | Josiam et al. | |
| 9,510,314 B2 | 11/2016 | Schmidt et al. | |
| 9,537,623 B2 | 1/2017 | Zhang | |
| 9,629,122 B2 | 4/2017 | Yoon et al. | |
| 9,629,171 B2 | 4/2017 | Roy et al. | |
| 9,635,579 B2 | 4/2017 | Wang et al. | |
| 9,654,236 B2 | 5/2017 | Jeong et al. | |
| 9,730,151 B2 | 8/2017 | Jia et al. | |
| 9,949,298 B1 * | 4/2018 | Akoum | H04W 74/0833 |
| 2009/0274226 A1 | 11/2009 | Mondal et al. | |
| 2013/0290525 A1 | 10/2013 | Fedor et al. | |
| 2014/0146732 A1 | 5/2014 | Olufunmilola et al. | |
| 2014/0321314 A1 | 10/2014 | Fodor et al. | |
| 2015/0134419 A1 | 5/2015 | Kandasamy et al. | |
| 2015/0163271 A1 | 6/2015 | Handuruksande et al. | |
| 2015/0257121 A1 | 9/2015 | Siomina et al. | |
| 2015/0373637 A1 | 12/2015 | Wang et al. | |
| 2016/0119902 A1 | 4/2016 | Cheong et al. | |
| 2016/0127006 A1 | 5/2016 | Majjigi et al. | |
| 2016/0173259 A1 | 6/2016 | Lee et al. | |
| 2016/0204910 A1 | 7/2016 | Kim et al. | |
| 2016/0269157 A1 | 9/2016 | Soriaga et al. | |
| 2016/0269158 A1 | 9/2016 | Soriaga et al. | |
| 2016/0270087 A1 | 9/2016 | Soriaga et al. | |
| 2016/0337872 A1 | 11/2016 | Alrabadi et al. | |
| 2016/0380732 A1 | 12/2016 | Chung et al. | |
| 2017/0026156 A1 | 1/2017 | Thomas et al. | |
| 2017/0064518 A1 | 3/2017 | Kim et al. | |
| 2017/0094676 A1 | 3/2017 | Kim et al. | |
| 2017/0099127 A1 | 4/2017 | Byun et al. | |
| 2017/0141823 A1 | 5/2017 | Fodor et al. | |
| 2017/0207843 A1 * | 7/2017 | Jung | H04B 7/0632 |
| 2017/0223655 A1 | 8/2017 | Huang et al. | |
| 2017/0223690 A1 | 8/2017 | Zeng et al. | |
| 2017/0238268 A1 | 8/2017 | Yang et al. | |
| 2017/0346539 A1 * | 11/2017 | Islam | H04B 7/0617 |
| 2017/0346544 A1 * | 11/2017 | Islam | H04B 7/0814 |
| 2017/0346545 A1 * | 11/2017 | Islam | H04B 7/0814 |
| 2018/0020383 A1 * | 1/2018 | Sirotkin | H04W 36/0088 |
| 2018/0069606 A1 * | 3/2018 | Jung | H04B 7/0408 |
| 2018/0123654 A1 * | 5/2018 | Park | H04B 7/0417 |
| 2018/0131434 A1 * | 5/2018 | Islam | H04B 7/086 |

FOREIGN PATENT DOCUMENTS

| | | |
|---|---|---|
| EP | 3120601 A1 | 1/2017 |
| KR | 20170057853 A1 | 5/2017 |
| WO | 2010145427 A1 | 12/2010 |
| WO | 2015010339 A1 | 1/2015 |
| WO | 2016130403 A1 | 8/2016 |
| WO | 2017086922 A1 | 5/2017 |

OTHER PUBLICATIONS

Jinxing Li et al., "System Design and Calibration for Wideband Channel Sounding With Multiple Frequency Bands", IEEE Access 5 (2017). pp. 781-793.

"High Frequency and High Speed Design Engineers Unite in Boston", Microwave Journal, microwavejournal.com, Oct. 1, 2016. 15 Pages.

Koen Langendoen, "Medium access control in wireless sensor networks." Medium access control in wireless networks vol. 2 (2008). 22 Pages.

Ayman Elnashar et al., "Looking at LTE in practice: A performance analysis of the LTE system based on field test results", IEEE Vehicular Technology Magazine vol. 8, Issue 3 (2013). pp. 81-92. https://www.researchgate.net/profile/Ayman_Elnashar/publication/260654677_Looking_at_LTE_in_Practice_A_Performance_Analysis_of_the_LTE_System_Based_on_Field_Test_Results/links/56b0ad0008ae9ea7c3ble552.pdf.

J. J. Kayra, "A Survey on the Effect of LTE Advanced on Drive Test Tool Requirements", signal 10.11: 12. 4 Pages. http://www.oamk.fi/~karil/mit_studies/wireless_future_seminar/papers2013/final_paper_kayra_janne.pdf.

Ionel Petrut et al., "User Experience Analysis on Real 3G/4G Wireless Networks", ACTA Electrotehnica vol. 56, No. 1-2, Mediamira Science Publisher (2015). pp. 131-134. http://ie.utcluj.ro/files/acta/2015/Number1-2/paper23_Petrut.pdf.

Nicholas Gresset et al., "Interference-avoidance techniques: Improving ubiquitous user experience", IEEE Vehicular Technology Magazine vol. 7, Issue 4 (2012). pp. 37-45. http://www.fr.mitsubishielectric-rce.eu/images/fck_upload/Gresset_VT12.pdf.

Duk-Sun Shim et al., "Application of Motion Sensors for Beam-Tracking of Mobile Stations in mmWave Communication Systems", Sensors vol. 14, No. 10 (2014). pp. 19622-19638. http://www.mdpi.com/1424-8220/14/10/19622/.

R. Mondal et al., "Performance evaluation of MDT assisted LTE RF fingerprint framework", 2014 Seventh International Conference on Mobile Computing and Ubiquitous Networking (ICMU) (2014). pp. 33-37. 10.1109/ICMU.2014.6799054.https://www.researchgate.net/publication/271462429_Performance_evaluation_of MDT_assisted_LTE_ RF_fingerprint_framework.

"Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2", 3GPP TS 37.320 version 12.2.0 Release 12, ETSI TS 137 V12.2.0 (2014). 27 Pages. http://www.etsi.org/deliver/etsi_ts/137300_137399/137320/12.02.00_60/ts_137320v120200p.

Azad Ravanshid et al., "Multi-connectivity functional architectures in 5G". 2016 IEEE International Conference on Communications Workshops (ICC) (2016). 6 Pages. https://5gnorma.5g-ppp.eu/dissemination/conference-papers/.

Paul Harris et al., "An overview of massive MIMO research at the University of Bristol", presented at the IET Radio Propagation and Technologies for 5G Conference (2016). 5 Pages. https://arxiv.org/abs/1705.07540.

* cited by examiner

CUSTOMER PREMISES EQUIPMENT DEPLOYMENT IN BEAMFORMED WIRELESS COMMUNICATION SYSTEMS

The present disclosure relates generally to wireless communication networks, and more particularly to devices, non-transitory computer-readable media, and methods for selecting a position for a deployment of a device in a beamformed wireless communication network.

BACKGROUND

Traditionally, high throughput and low latency communications in residential or business premises are provided by means of wired communications systems. In case of optical technologies, fiber lines are installed to the residential or business building whereas in the case of electrical technologies, copper lines are installed. Such techniques require significant capital expenditures as installation usually requires underground placement of the copper or fiber cables, the obtaining of permits, and so forth. Hence, network operators have transitioned to wireless communications systems to provide high throughput and low latency communications in residential or business structures. Unlike mobile networks, where the user equipment is nomadic, user equipment in residences or offices are stationary, for instance, desktop computers, televisions, set-up boxes, game consoles, appliances, printers, fax machines, home gateways, wireless local area network (WLAN) access points (APs), and so forth. Technologies that wirelessly provide high throughput and low latency communications to residential or business structures are commonly referred to as fixed wireless services.

SUMMARY

In one example, the present disclosure discloses a device, computer-readable medium, and method for selecting a position for a deployment of a device in a beamformed wireless communication network. For example, a method may include a processing system of a device having a processor capturing, at a first position comprising a first location and a first spatial orientation of the device, a first measurement of a performance indicator based upon at least a first wireless signal from a base station of a beamformed wireless communication network and capturing, at a second position comprising a second location and a second spatial orientation of the device, a second measurement of the performance indicator based upon at least a second wireless signal from the base station of the beamformed wireless communication network. The method may further include the processing system selecting a position for a deployment of the device based upon the first measurement of the performance indicator and the second measurement of the performance indicator and providing at least one instruction for the deployment of the device at the position that is selected.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
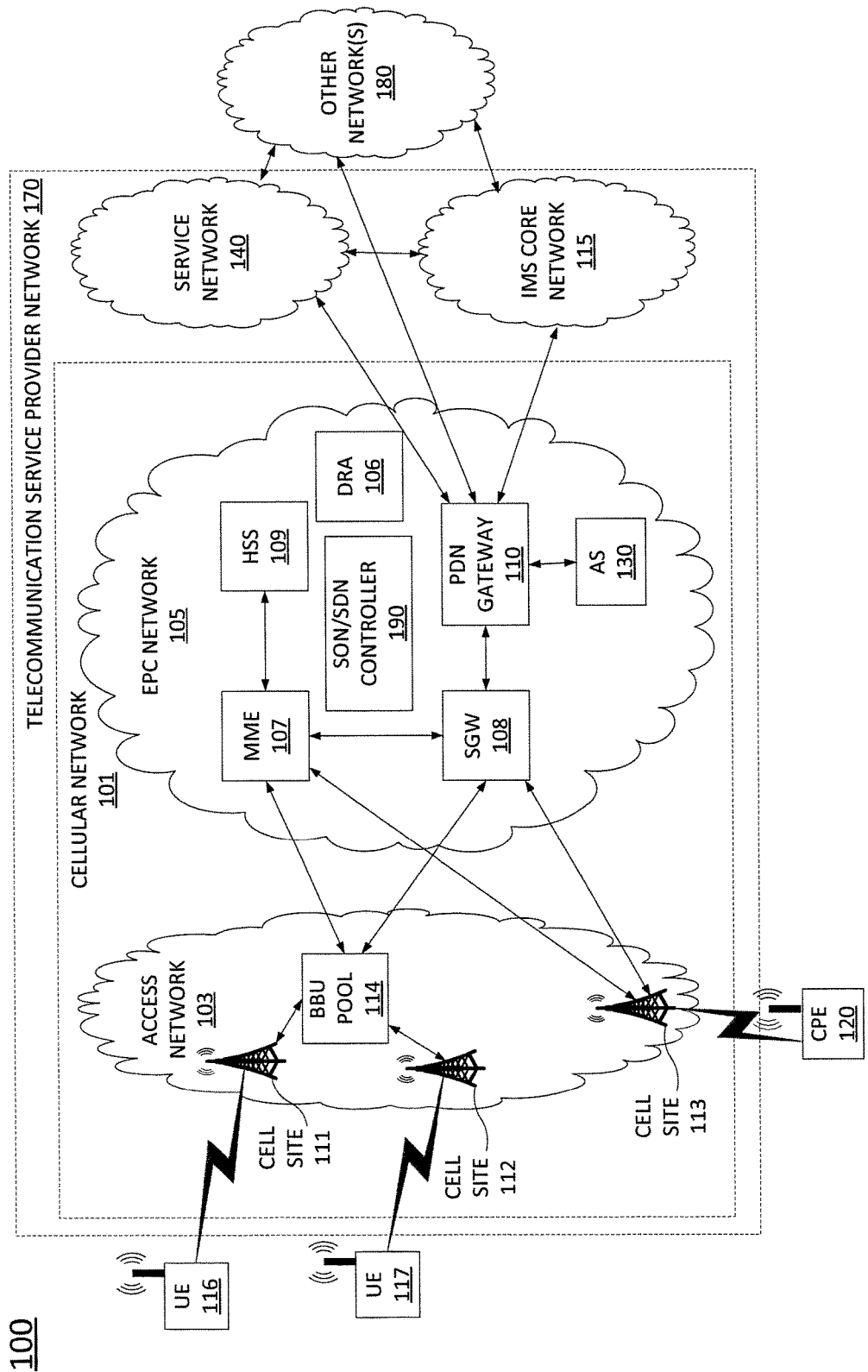
FIG. 1 illustrates a block diagram of an example system, in accordance with the present disclosure.

The present disclosure broadly discloses methods, computer-readable media, and devices for selecting a position for a deployment of a device in a beamformed wireless communication network. For example, a device, such as a customer premises equipment (CPE) or user equipment (UE), may use a gyroscope, a compass, and positioning technology, such as a Global Positioning System (GPS) receiver, to translate layer 1 (L1) and/or layer 3 (L3) measurements of one or more performance indicators (e.g., one or more "key performance indicators" (KPIs), such as a received signal strength) in a beamformed wireless communication system into a global coordinate system. In one example, the device then calculates an optimal, preferred, or recommended position (location and spatial orientation) for deployment of the device in the global coordinate system based on the measurements of the one or more performance indicators. In addition, in one example, a display and/or a speaker of the device may be used to instruct a user how to place and orient the device for optimal, preferred, or recommended performance. Examples of the present disclosure are more accurate and less complex than existing solutions that rely on satellite images and complicated ray tracing tools to determine optimal CPE placement.

Millimeter wave (mmWave) spectrum (e.g., spectrum with carrier frequencies between 30 and 300 GHz), is attractive for fixed wireless communications systems, e.g., fixed mobile broadband (FMB), since available transmission bandwidth roughly scales with the carrier frequency. However, the coupling loss between a transmitter and a receiver also scales as a function of the transmission bandwidth due to the larger thermal noise floor. In order to overcome the coupling loss at high carrier frequencies, and also because the antenna apertures are much smaller at higher frequencies, antenna arrays with a large number of antenna elements are employed in mmWave communications systems. In addition, these antenna arrays are used to electrically steer transmissions into a certain direction (also known as beamforming) by co-phasing the waveforms of the various antenna elements.

The beamformed nature of such a wireless communications system complicates its design and operation. Long Term Evolution/4G radio access networks are omni-directional wireless communications systems. In such systems, a single synchronization signal (SS), e.g., comprising a primary synchronization signal (PSS) and secondary synchronization signal (SSS) respectively, is transmitted that can be received by all receivers regardless of their spatial orientation with respect to the boresight of the transmitting antenna array. In a beamformed or "beam-swept" communications system, on the other hand, different synchronization signals may be transmitted using different beams such that the entire azimuth and elevation domain is sampled.

In one example, U×V beams are used to sample U directions in azimuth and V directions in elevation. In other words, each of the U×V beams is associated with two angles, one for the azimuth and one for the elevation. In one example, the receiver may distinguish the U×V beams via different sequences which are transmitted on each beam. The same sequences that distinguish transmit beams (or different sequences) can also be used to obtain time and frequency synchronization at the receiver. For example, the receiver may use a PSS to obtain symbol timing alignment in an orthogonal frequency division multiple access (OFDMA) communications system. The symbol timing allows the receiver to perform a discrete Fourier transform (DFT) of the received signal in order to process the received waveform in the frequency domain. In order for a receiver to detect the base station transmitter, the transmitter may send multiple secondary synchronization signals, where each SSS may be associated with a unique sequence transmitted using a different beam. Depending on the wireless propagation channel between the transmitter and receiver, the receiver may detect energy in one or more directions/spatial orientations. For example, the receiver may correlate known sequences with the received signal in order to detect the sequence corresponding to the spatial orientation/direction in which the signal was received with the largest power. Based on the time and/or frequency resources in which the sequence was detected and/or the sequence itself, the receiver may initiate a random access procedure. For instance, the receiver may transmit a preamble on a physical random access channel (PRACH) which itself may encode the spatial orientation/direction in which the synchronization signal was received, thereby informing the base station transmitter about the spatial properties of the wireless communications link. The base station transmitter and the receiver may then use the information obtained via the described initial access procedure to establish a communications link using beamformed transmissions. For example, the base station transmitter and the receiver may use mutually known transmit and receive beams to communicate with each other. In one example, the receiver maintains a list of beam pairs, where each pair corresponds to a transmit beam at the base station and a receive beam at the receiver.

Thereafter, a beam management procedure is used to keep the transmit and receive beams at the base station and receiver, respectively, synchronized. In other words, the beam management procedure ensures that the transmitter steers the radiated power in a spatial direction that allows the receiver to receive the waveform with the largest received power; and in turn, the receiver may align a phased antenna array with the spatial direction in which it receives the waveform with the largest power. In a line-of-sight (LOS) scenario, the transmit and receive beams will be aligned, whereas in non-line-of-sight (NLOS) scenarios, the transmit and receive beam directions (spatial orientations) will not be aligned, due to reflections from nearby buildings, landscape features, and so forth.

In one example, the receiver performs Layer 1 (L1) and Layer 3 (L3) measurements of one or more performance indicators for the purposes of establishing a communication link via one or more beam pairs and for beam management. While the L1 and L3 measurements do correlate the received power with spatial orientations/directions, in practice logical beam indices or sequence indices are used to discern the various beams and beam pairs. For example, the transmitter may transmit a dedicated waveform associated with a beam identifier (ID) using a given transmit beam pointing into a given spatial orientation/direction, thereby associating the transmit beam and the corresponding spatial orientation with the beam ID. The receiver may then organize the sequences (IDs respectively) detected from various directions/spatial orientations using the same or different receive beams IDs, sorted by corresponding received power without an actual notion of the spatial orientation/direction in which the sequence was received. In other words, each sequence/ID is associated with a receive beam (or receive beam index) and a received power. For the purpose of radio resource management (RRM) the user equipment may report the IDs corresponding to the N largest received powers to the beamformed wireless communication network via the base station transmitter (or via a different base station/cell site). In one example, the base station transmitter may inform the receiver on which beam (e.g., according to which ID) data will be sent, and the receiver may then tune the receive beam by choosing the receive beam direction associated with the ID.

In one example, an endpoint device may calculate a direction, or spatial orientation of a receive beam with respect to a local coordinate system, e.g., a three dimensional space with dimensions/axis aligned to a length, a width, and a depth of the endpoint device, for example. In one example, an endpoint device may include a phased array of antenna elements that may be manufactured and/or configured to provide a number of possible receive beams (or receive beam directions/spatial orientations) within a given azimuth and elevation range. In addition, in one example, the endpoint device may be configured to associate each receive beam (or receive beam direction/orientation) with a vector/direction/spatial orientation in a local coordinate system that is fixed, e.g., with respect to the endpoint device chassis. For instance, the endpoint device may be configured with a mapping of receive beams to spatial orientations/directions in the local coordinate system.

It should be noted that other local coordinate systems may have a different alignment with respect to the endpoint device (e.g., offset 30 degrees from the major dimensions/axis of the endpoint device). In any case, a local orientation of a receive beam in a local coordinate system may be translated into a global orientation, e.g., in the global coordinate system. In one example, the translations may be based upon the difference between the local orientation and the global orientation, which can be estimated using a gyroscope and compass of the endpoint device. The determination of a direction/orientation of a receive beam and the translation to a spatial orientation in a global coordinate system are described in greater detail below in connection with the example of FIG. 2.

In one example, an endpoint device, e.g., a CPE may be deployed at one or more locations and/or positions, and a series of measurements of one or more performance indicators may be taken. For instance, the CPE may be intended for deployment at a customer premises where it may be possible to place the CPE on a table near a window in a conference room, in a reception area near a Wi-Fi access point, and so forth. Thus, the CPE may capture and store measurements of performance indicators over each receive beam direction at one or more different locations. In one example, at each location the CPE may sweep a receive beam via each receive beam direction by setting a voltage and phase driving each antenna element of an antenna array according to a look up table where each entry corresponds to a receiver beam index. In addition, for each receive beam direction, the CPE may correlate the received waveform with a set of known sequences. For instance, for each receive beam direction, the CPE may capture one or more measurements of a performance indicator (or measurements of multiple performance indicators), such as a received signal strength, and may store the measurement(s) in one or more records indexed by the receive beam ID, by the transmit-receive beam pair IDs, or the like. In another example, the CPE may store for each receive beam and/or receive beam direction the maximum or minimum measurement (e.g., a maximum received power, a minimum bit error rate, etc.).

The performance indicators measurements may include synchronization signal (SS) block reference signal received power (RSRP) and/or channel state information (CSI)-RSRP measurements, e.g., as part of beam management (BM) and/or beam recovery (BR) procedures in accordance with a cellular communication protocol employed by the beamformed wireless communication network and implemented at the base station and the CPE. In addition, the performance indicator measurements may be layer 1 (L1) or layer 3 (L3) filtered, may be beam-specific, and different combinations of measurement types may be collected and tagged by the CPE with location information and spatial orientation information.

In one example, a display of the CPE may show a timer, e.g., in the form of a counter or a progress bar. For example, the beam sweep procedure at each location for capturing the measurement(s) of the performance indicator(s) for each receive beam direction may take several milliseconds or seconds during which the CPE should not be moved. It should be noted that small jitters in the position of the CPE can be compensated for in a manner similar to optical image stabilization, e.g., using a gyroscope and/or a compass.

When all potential locations for the CPE are measured, the CPE may be instructed to determine an optimal, preferred, and/or recommended position for the CPE based on the measurement(s) of the performance indicator(s). In one example, the position (including a location and a spatial orientation) is determined automatically after measurements are captured at a given number locations. In another example, the position is determined by clicking a button on the CPE, e.g., a physical switch, or a soft-button on a touch-sensitive display of the CPE. In one example, the (optimal/preferred/recommended) position of the CPE is calculated by comparing all performed measurements in a global coordinate system.

In one example, the position is determined by selecting the location corresponding to the largest received power for any receive beam direction, and by selecting a spatial orientation with the boresight of the CPE antenna array(s) aligned with the spatial orientation of the receive beam direction which is determined to have the largest received power. In another example, the position is determined by choosing the location corresponding to the largest number of receiver beam directions having measurements of a performance indicator above a predefined or preconfigured threshold (or below such a threshold, depending upon the particular type of performance indicator). In one example, the threshold may also be a relative threshold, e.g., a number of receive beam directions having measurements of the performance indicator at or above X percent of an average measurement of a performance indicator, at or above Y percent of a highest measurement of the performance indicator, or the like. The spatial orientation of the position may be calculated as a direction/spatial orientation via which the largest number of such receive beam directions are visible when aligned with a boresight of the antenna array(s) of the CPE. For instance, the CPE may be capable of sweeping the receive beam across 60 degrees in azimuth (30 degrees horizontally to either side of boresight). In addition, as described above, the transmitter and receiver may maintain a list of transmit and receive beams as part of the beam management procedure. This allows switching from one transmit-receive beam pair to another pair in case a physical object blocks the communication link over the configured transmit-receive beam pair, thereby allowing seamless and uninterrupted communication despite the random propagation environment. For example, a "best" transmit-receive beam pair, e.g., a transmit-receive beam pair with a highest measured received signal strength, may be temporarily blocked by a passing truck. Similarly, a changing landscape, e.g., trees growing leaves in the spring and summer seasons, may block the "best" transmit-receive beam pair. Hence, a location with a larger number of high power receive beams may be advantageous over a location with a single beam but with the largest receive power.

After the optimal/recommended/preferred position in a global coordinate system has been determined, the CPE can assist a user, e.g., a customer, a subscriber, a field technician, etc., in placing the CPE at the position. In one example, the UE/CPE uses a display, a speaker, and/or a headset to guide the user towards the position (comprising a location and a spatial orientation). For example, the user may first be guided to the location using GPS navigation components of the UE/CPE, via cell identifier (cell ID) based methods, observed time difference of arrival (OTDA) techniques, and/or barycentric triangulation, and so on.

In some cases, such as in certain indoor environments, various location determination techniques may be unavailable or inaccurate. Accordingly, in one example, a user may label each location, such as: "kitchen," "office," "bedroom 1," "bedroom 2," "bedroom 3," "master bedroom," "family room," "dining room," "living room," and so forth. Similarly, a user may label locations in an office building with floor and office numbers, cubicle numbers, or the like. The labels may be entered via a physical keyboard, via a keyboard interface presented on a touch display, via a verbal/audio input, and so on. When guiding a user to the optimal, preferred, and/or recommended position, the CPE may present the label for the associated location via a display screen or may present the label for the location via a speaker or headset. The user may then guide the CPE to the corresponding location.

In a second step, a gyroscope and/or a compass of the CPE is used to ensure the spatial orientation of the UE/CPE is correct. For example, the user may indicate that the CPE has been placed at the location either through voice input, by touching a touch-sensitive display on the CPE or by manipulating a physical key of the CPE. Once the CPE is placed at the location, the CPE may use a gyroscope and/or a compass together with audio and/or visual commands and feedback to align the receiver at the correct location and in the correct spatial orientation.

Although examples of the present disclosure are applicable to a wide range of frequency bands, in one example, the present disclosure may relate to centimeter and millimeter wave systems. For instance, for all of the examples herein, the considered wireless cellular communications standard may be the Third Generation Project (3GPP) New Radio (NR) and/or 5G radio access technology. For the examples herein, the base station can be a gNB or gNodeB, or base station of a 5G-RAN (fifth generation radio access network).

In addition, examples of the present disclosure are illustrated primarily regarding measurements of performance indicators with respect to waveforms or signals associated with initial access procedures (e.g., measurements on the PSS or the SSS of a SS block, a physical broadcast channel (PBCH), and/or a downlink modulation reference signal (DMRS) contained within the SS block, etc.). However, examples of the present disclosure are not so limited, and may be applied to a variety of other types of waveforms, signals, and/or events. For example, a CPE may be deployed at a candidate location and may establish one or more communication links with the transmitting base station. In addition, actual or test data may be conveyed via the link, whereby the CPE may record any blockage events occur that may occur, e.g., radio link interruption (RLI) events which result in the initiation of radio link failure (RLF) procedures, RLI events which do not result in the initiation of RLF procedures, and so on. Similarly, the CPE may be configured to record events related to random access channel (RACH) procedures, including location(s) and spatial orientation information. The RACH event recording may also include a time stamp and other relevant parameters, such as a duration of a RACH failure event, RACH resources selected by the mobile endpoint device (e.g., preamble format, number of repetitions, time/frequency resources, etc.), transmission power, and transmit/receive (Tx/Rx) beamforming utilized at the mobile endpoint device. Thus, the performance indicators measured via the present disclosure may include: a received signal strength, a bit error rate, a packet loss rate, a round trip time, a delay measure, a beam failure event, a radio link interruption event, a random access procedure failure event, or the like.

It should also be noted that for illustrative purposes, various beamformed wireless communication systems are described herein in connection with particular quantities or values. However, beamformed wireless communication systems of the present disclosure may include different quantities of various components, and/or operating parameters which may have any number of different values. For instance, a beamformed wireless communication system may have base stations with a different number transmit antennas, may have antennas with different beamwidths, may utilize different frequencies, may utilize different transmit powers, and so forth. In addition, a beamformed wireless communication system may include base stations with a different number of antenna sector units covering a same or a different range in azimuth and/or elevation, may have sectors with different coverages, may have a different number of antenna elements per sector, may have a different desired SNRs, may utilize a fewer number of samples per antenna for a different averaging gain, and so forth. These and other aspects of the present disclosure are discussed in greater detail below in connection with the examples of FIGS. 1-4.

To better understand the present disclosure, FIG. 1 illustrates an example network, or system 100 in which examples of the present disclosure for selecting a position for a deployment of a device in a beamformed wireless communication network may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 170. FIG. 1 also illustrates various mobile endpoint devices, e.g., user equipment (UE) 116 and 117. The UE 116 and 117 may each comprise a cellular telephone, a smartphone, a tablet computing device, a laptop computer, a pair of computing glasses, a wireless enabled wristwatch, or any other cellular-capable mobile telephony and computing device (broadly, "a mobile endpoint device").

In one example, the cellular network 101 comprises an access network 103 and a core network, Evolved Packet Core (EPC) network 105. In one example, the access network 103 comprises a cloud RAN. For instance, a cloud RAN is part of the 3rd Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114.

In accordance with the present disclosure, any one or more of cell sites 111-113 may be deployed with antenna and radio infrastructures, including multiple input multiple output (MIMO) and millimeter wave antennas. Furthermore, in accordance with the present disclosure, a base station (e.g., cell sites 111-113 and/or baseband units within BBU pool 114) may comprise all or a portion of a computing device or system, such as computing system 400, and/or processing system 402 as described in connection with FIG. 4 below, and may be configured to provide one or more functions to support examples of the present disclosure for selecting a position for a deployment of a device in a beamformed wireless communication network, and to perform various other operations in accordance with the present disclosure.

As further illustrated in FIG. 1, CPE 120 may comprise a user equipment, e.g., a mobile endpoint device comprising a cellular telephone, a smartphone, a tablet computing device, a laptop computer, or any other cellular-capable mobile telephony and computing devices. In one example, CPE 120 may comprise a wireless transceiver for a fixed wireless broadband (FWB) deployment with one or more directional antennas, or antenna arrays (e.g., having a half-power azimuthal beamwidth of 120 degrees or less, 90 degrees or less, 60 degrees or less, etc.).

In one example, each of the UE 116 and 117, and the CPE 120 may comprise all or a portion of a computing device or system, such as computing system 400, and/or processing system 402 as described in connection with FIG. 4 below, and may be configured to provide one or more functions for selecting a position for a deployment of a device in a beamformed wireless communication network, and for performing various other operations in accordance with the present disclosure. For instance, UE 116, UE 117, and/or CPE 120 may be configured to perform functions such as those described below in connection with the example method 300 of FIG. 3.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, each of UE 116, UE 117, and CPE 120 may also include a MIMO antenna to receive multi-path and/or spatial diversity signals, a gyroscope and compass to determine orientation(s), and so forth. In one example, UE 116, UE 117, and/or CPE 120 may further include a GPS for determining a location. To illustrate, UE 116, UE 117, and/or CPE 120 may receive at least one wireless signal from one of cell sites 111-113, capture a measurement of performance indicator based upon the at least one wireless signal, record a location and spatial orientation information for the measurement of the performance indicator, select a position for a deployment of the UE 116, UE 117, and/or CPE 120 based upon the first measurement of the performance indicator and the second measurement of the performance indicator and provide at least one instruction for the deployment of the UE 116, UE 117, and/or CPE 120 at the position that is selected. The at least one performance indicator may comprise a received signal strength, a bit error rate, a packet loss rate, a round trip time, a delay measure, a beam failure event, a radio link interruption event, a random access procedure failure event, or the like.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, cell sites 111 and 112 in the access network 103 are in communication with the EPC network 105 via baseband units in BBU pool 114. In operation, UE 116 may access wireless services via the cell site 111 and UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between 5G, LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway 110 is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices for providing services to subscribers, customers, and or users. For example, telecommunication service provider network 170 may provide a cloud storage service, web server hosting, and other services. As such, service network 140 may represent aspects of telecommunication service provider network 170 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 190.

In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 111 and 112, respectively, may allocate and deactivate baseband units in BBU pool 114, and may perform other operations for activating antennas based upon a location and a movement of a mobile endpoint device or a group of mobile endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

Accordingly, the SON/SDN controller 190 may be connected directly or indirectly to any one or more network elements of EPC network 105, and of the system 100 in general. Due to the relatively large number of connections available between SON/SDN controller 190 and other network elements, none of the actual links to the application server are shown in FIG. 1. Similarly, intermediate devices and links between DRA 106, MME 107, SGW 108, cell sites 111 and 112, PDN gateway 110, and other components of system 100 are also omitted for clarity, such as additional routers, switches, gateways, and the like.

As further illustrated in FIG. 1, EPC network 105 may further include an application server (AS) 130, which may comprise all or a portion of a computing device or system, such as computing system 400, and/or processing system 402 as described in connection with FIG. 4 below, and may be configured to perform various operations in connection with selecting a position for a deployment of a device in a beamformed wireless communication network, and for performing various other operations in accordance with the present disclosure. For instance, examples of the present disclosure relate to selecting a position for a deployment of a device in a beamformed wireless communication network where the operations are performed at the device itself (e.g., at CPE 120, UE 116 and/or UE 117). However, in another example, the selecting of a position for a deployment of a device (e.g., a CPE) in a beamformed wireless communication network may be performed by a network-based device, such as AS 130.

To illustrate, AS 130 may receive from UE 116, UE 117, and/or CPE 120 measurements of one or more performance indicators along with associated locations and spatial orientation information of the measurements, and may then select the optimal, preferred, and/or recommended position for deployment of UE 116, UE 117, and/or CPE 120 in response to the measurements of the performance indicator(s) (along with the location(s) and the spatial orientations of such measurements). In one example, AS 130 may receive measurement records comprising the measurements of the performance indicator(s), and the location(s) and the spatial orientations of such measurements. The measurement records may further include time stamps, and other relevant information, such as transmit-receive beam pair IDs, modulation coding schemes in use, and so forth. In one example, the records may be sent by UE 116, UE 117, and/or CPE 120 and received by AS 130 via cell sites 111-113. AS 130 may then select the optimal, preferred, and/or recommended position for deployment of UE 116, UE 117, and/or CPE 120 in the same or a similar manner as described above. However, in such case, AS 130 may further transmit instructions to UE 116, UE 117, and/or CPE 120 to inform of the optimal, preferred, and/or recommended position that is selected. In addition, in one example, AS 130 may further transmit instructions to UE 116, UE 117, and/or CPE 120 to help guide a user in the placement of the device in the correct position.

In addition, in one example, AS 130 may also configure UE 116, UE 117, CPE 120, etc. to perform various functions for selecting a position for a deployment of a device in a beamformed wireless communication network, in accordance with the present disclosure. For example, AS 130 may also configure UE 116, UE 117, and/or CPE 120 to collect measurements of a particular type of performance indicator, to utilize a particular location determination technique, to collect measurements with a particular periodicity, and so on. In examples where the selection of an optimal, preferred, and/or recommended position is made by AS 130, AS 130 may also configure UE 116, UE 117, and/or CPE 120 to report measurements with a particular periodicity, to report measurement records on demand, to report measurement records via a particular type of radio access technology (e.g., via LTE components of cellular network 101), to report measurement records when a measurement of a performance indicator exceeds a fixed or relative threshold, and so on.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., a 2G network, a 3G network, a 5G network, an integrated network, e.g., including any two or more of 2G-5G infrastructure and technologies, and the like), that are suitable for use in connection with examples of the present disclosure for selecting a position for a deployment of a device in a beamformed wireless communication network. For example, as illustrated in FIG. 1, the cellular network 101 (broadly a "beamformed wireless communication network") may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 130 of FIG. 1 may represent an application function (AF) for selecting a position for a deployment of a device in a beamformed wireless communication network, and for performing various other operations in accordance with the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
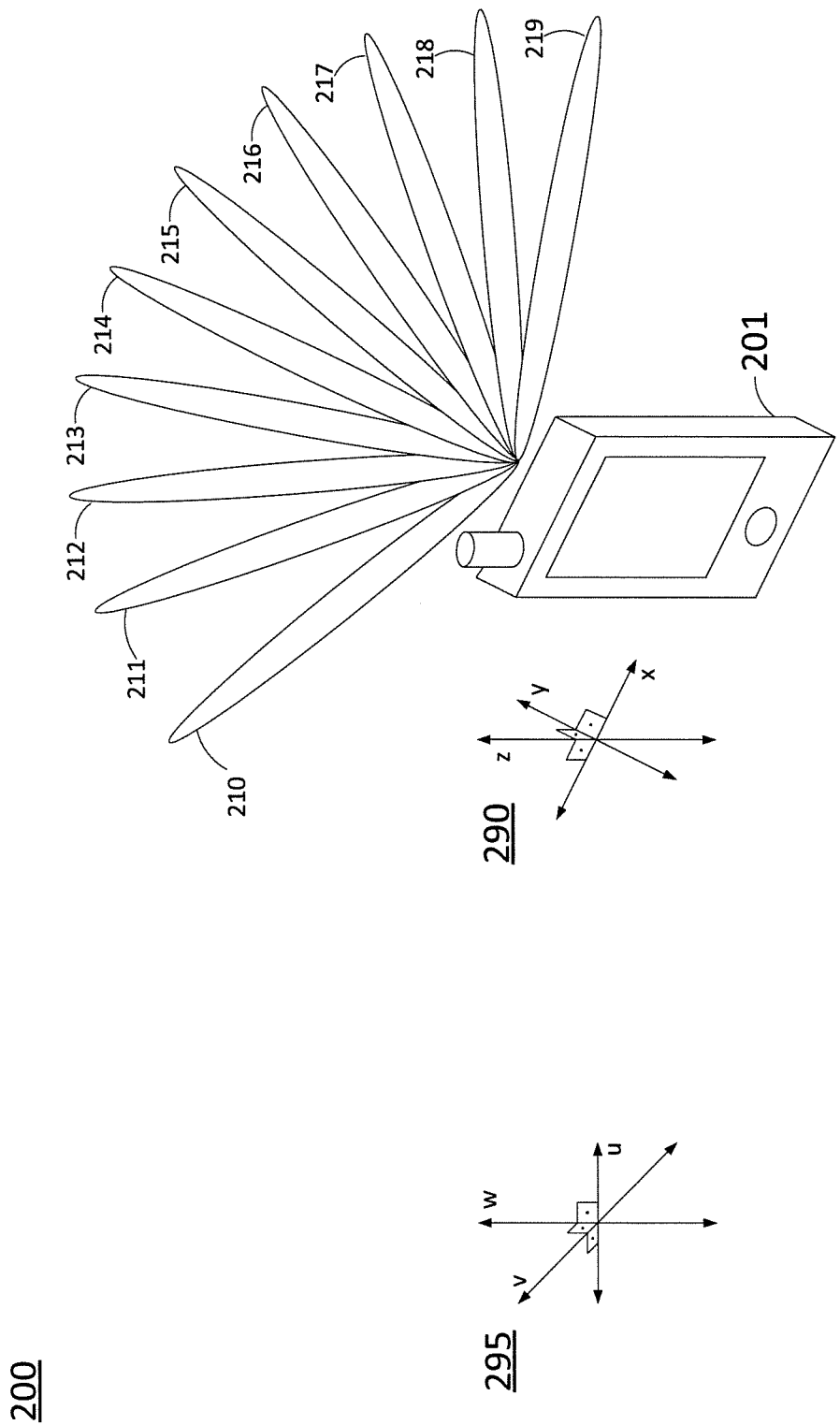
FIG. 2 illustrates translation of spatial orientation information of a local coordinate system with respect to a device into spatial orientation information in a global coordinate system, in accordance with the present disclosure.

FIG. 2 illustrates an example translation of spatial orientation information of a local coordinate system with respect to a receiver device into a global coordinate system. In particular, FIG. 2 illustrates an environment 200 containing a receiver device 201. The orientation of receiver device 201 (e.g., a mobile endpoint device, UE, and/or CPE) is illustrated with respect to local coordinate system 290 containing axis (x, y, z). A global coordinate system 295 having a different orientation and containing axis (u, v, w) is also illustrated in FIG. 2. The receiver device 201 may include a phased array antenna to receive multi-path and/or spatial diversity signals, e.g., via receive beams 210-219. Each of the receive beams 210-219 may have different azimuth and elevation bearings from the other receive beams of receive beams 210-219. In one example, signals on receive beams 210-219 may be identified by receive beam indexes/indices or logical beam identifiers (beam IDs).

In one example, the receiver device 201 can identify a wireless signal on one of the receive beams 210-219 via voltage(s) and phase(s) in the receiver circuitry associated with one or more given antenna elements of a phased antenna array, or via a logical index associated with a respective receive beam 210-219. The receiver device 201 may also translate each of the receive beams 210-219 to a set of angles (or angles and magnitudes), n-tuples of coordinates defining a unit vector (or defining a magnitude and direction/orientation), or any other definitive units of local coordinate system 290, thereby giving the receive beams 210-219, identified with a logical "beam ID," a physical spatial direction/orientation with respect to the local coordinate system 290.

In one example, the local coordinate system 290 may be mapped or translated to the global coordinate system 295. For instance, global coordinate system 295 may have two dimensions corresponding to a planar estimation of the surface of the Earth (e.g., the "u" axis and "v" axis in FIG. 2), with the third dimension (e.g., the "w" axis) being normal to the plane. In addition, the planar estimation of the surface of the Earth can also be aligned such that one dimension is north-south (e.g., the "v" axis) and another dimension is east-west (e.g., the "u" axis). Accordingly, the orientations of the (x, y, z) axis of local coordinate system 290 relative to the (u, v, w) axis of global coordinate system 295 may be determined from a gyroscope and compass of the receiver device 201. The directions/orientations of the receive beams 210-219 may be similarly translated into directions/orientations in the global coordinate system 295 via the same mapping.

In one example, a location of receiver device 201 in local coordinate system 290 may be translated into a location in global coordinate system 295. For instance, receiver device 201 may estimate its position relative to several base stations/cell sites using observed time difference of arrival (OTDA). Once receiver device 201 determines its location relative to these base stations/cell sites, the receiver device 201 may then determine an absolute location (e.g., a latitude and a longitude) from the location relative to fixed known locations of the base stations/cell sites. However, in another example, the receiver device 201 may include a GPS receiver such that receiver device 201 may determine an absolute location (e.g., in global coordinate system 295) which may comprise a standard latitude and longitude.

For a given location in the local coordinate system 290 corresponding to a location in the global coordinate system 295, the receiver device 201 may collect a set of measurements of one or more performance indicators. For instance, for each spatial direction/receive beam direction 210-219, or for a subset of the receive beams 210-219, the receiver device 201 may perform a series of predefined or configurable measurements. For example, for each spatial direction/receive beam direction 210-219 the receiver device 201 may perform a cell search procedure. More precisely, the receiver device 201 may set the voltage and phase driving each antenna element of a phased antenna array according to a look up table where each entry corresponds to a receiver beam index, correlate a received waveform with a set of known sequences, determine for each correlation the received power, store the maximum received power, and determine the maximum received power for each receiver beam index in the look-up table. In other words, for the given location the receiver device 201 will sample the space according to the receiver beam directions in the look-up table. For each receive beam direction 210-219, the receiver device 201 may log the received power (or capture one or more other performance indicator measurements). For example, the receiver device 201 may use synchronization signals and/or a physical broadcast channel (PBCH) transmitted by a base station/cell site. This allows the receiver device 201 to determine the distribution of received power as sampled by the receive beam direction 210-219. Furthermore, each performance indicator measurement may be associated with a location and orientation of the receiver device 201 (e.g., a UE and/or CPE). It should be noted although the foregoing is described with respect to a receiver device 201, it should be understood that receiver device 201 may be further equipped for transmission/uplink communications. Similarly, examples of the present disclosure may also be applied to measurements of performance indicators with regard to uplink communications, and the selecting a position for a deployment of a device in a beamformed wireless communication network based upon such measurements.

Figure 3:
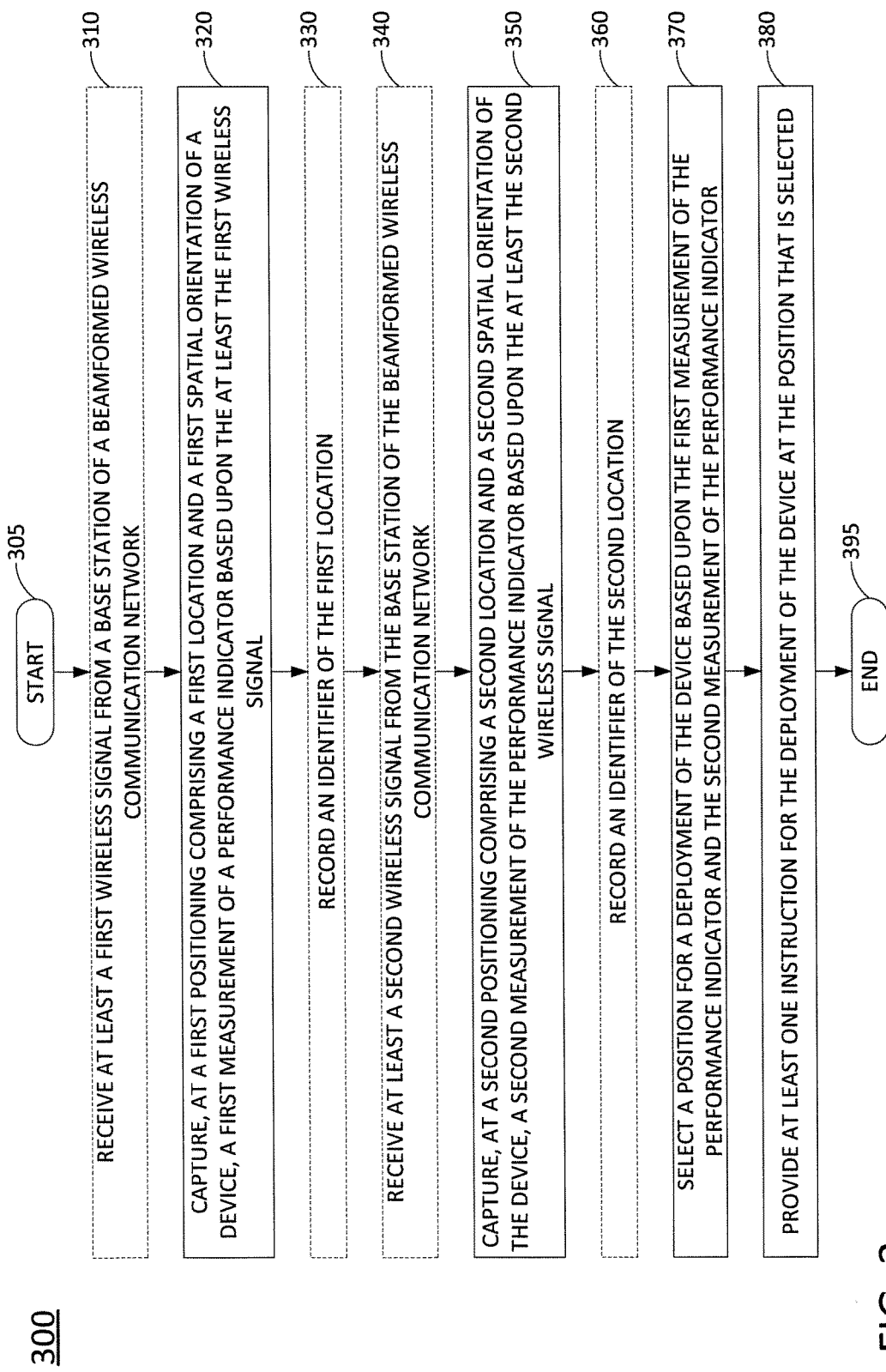
FIG. 3 illustrates a flowchart of an example method for selecting a position for a deployment of a device in a beamformed wireless communication network.

FIG. 3 illustrates a flowchart of an example method 300 for selecting a position for a deployment of a device in a beamformed wireless communication network, in accordance with the present disclosure. In one example, steps, functions and/or operations of the method 300 may be performed by a device as illustrated in FIG. 1, e.g., a receiver device comprising a mobile endpoint device, UE, and/or CPE, or any one or more components thereof, such as a processing system, a Global Positioning System (GPS) receiver, a phased antenna array, and so forth. In one example, the steps, functions, or operations of method 300 may be performed by a computing device or system 400, and/or a processing system 402 as described in connection with FIG. 4 below. For instance, the computing device 400 may represent at least a portion of a receiver device in accordance with the present disclosure. For illustrative purposes, the method 300 is described in greater detail below in connection with an example performed by a processing system, such as processing system 402. The method 300 begins in step 305 and may proceed to optional step 310 or to step 320.

At optional step 310, the processing system may receive at least a first wireless signal from a base station of a beamformed wireless communication network. In one example, the processing system is a component of a receiver device that is deployed at a first position, e.g., having a first location and a first spatial orientation. The at least first wireless signal may comprise a signal (or a channel) related to initial access procedures, such as a primary synchronization signal (PSS), a secondary synchronization signal (SSS), a physical broadcast channel (PBCH), and/or a downlink modulation reference signal (DMRS) contained within a synchronization signaling (SS) block. In one example, the at least first wireless signal may comprise a reference signal (RS), or multiple reference signals, as an alternative or in addition to the SS block, such as a channel station information reference signal CSI-RS. In one example, the at least first wireless signal is transmitted via a directional antenna, e.g., a phased array antenna for beamforming. Thus, the at least first wireless signal may be associated with a particular transmit beam or transmit beam direction (in azimuth and elevation) with respect to the phased antenna array. In addition, the at least first wireless signal may be received via a particular receive beam (or receive beam direction) with respect to the receiver device. For instance, receive beams may be identified by receive beam indexes/indices or logical beam identifiers (beam IDs). In one example, the processing system may sweep a receive beam of the receiver device over a plurality of receive beam directions by setting a voltage and phase driving each antenna element of an antenna array according to a look up table where each entry corresponds to a receiver beam index. In one example, the at least first wireless signal may comprise a plurality of wireless signals, such as successive synchronization signals or reference signals over multiple bursts via the same or different transmit beams, and may be received via the same or different receive beam directions.

At step 320, the processing system captures, at the first position comprising the first location and the first spatial orientation of the receiver device, a first measurement of a performance indicator based upon the at least first wireless signal from the base station of the beamformed wireless communication network. In one example, the processing system may perform synchronization signal (SS) block reference signal received power (RSRP) and/or channel state information (CSI)-RSRP measurements, e.g., as part of beam management (BM) and/or beam recovery (BR) procedures in accordance with a communication protocol employed by the beamformed wireless communication network. The performance indicator may comprise a received signal strength, a bit error rate, a packet loss rate, a round trip time, a delay measure, a beam failure event, a radio link interruption event, a random access procedure failure event, or the like. In one example, step 320 also includes the processing system recording a location and spatial orientation information for the first measurement of the performance indicator. In one example, the location may be determined via a GPS receiver, or may be derived using other location estimation methods, such as cell ID based methods, observed time difference of arrival (OTDA) techniques, or barycentric triangulation. In one example, the location may comprise latitude and longitude coordinates. In one example, at step 320, the processing system may further record a time associated with the first measurement of the performance indicator.

In one example, the processing system may calculate a direction/spatial orientation of a first receive beam (e.g., a receive beam on which the at least the first wireless signal is received) with respect to a local coordinate system of the mobile endpoint device. For instance, the processing system may associate each receive beam (or receive beam direction/spatial orientation) with a vector/direction/spatial orientation in a local coordinate system that is fixed, e.g., with respect to the receiver device chassis. In addition, in one example, the processing system may translate the spatial orientation of the first receive beam from a local coordinate system to a spatial orientation in a global coordinate system e.g., azimuth angles indicated with respect to 360 degrees, with 0/360 being north, magnetic north, or other reference standards, and elevation angles with respect to the horizon of the Earth. For example, the first receive beam direction may be determined via voltages and phases in a receiver circuitry associated with antenna elements of a phased antenna array of the device. In addition, the first receive beam direction may be further determined via a gyroscope and compass of the mobile endpoint device. For example, the processing system may translate the spatial orientation of the first receive beam from a local coordinate system to a spatial orientation in a global coordinate system. The translation may be based upon the difference between the local orientation and the global orientation, which can be estimated using the gyroscope and compass of the receiver device. Accordingly, the first measurement of the performance indicator may be associated with the first receive beam direction of the receiver device.

In one example, the capturing of the first measurement of the performance indicator at step 320 comprises capturing, at the first position, a first plurality of measurements of the performance indicator with respect to a first plurality of receive beam directions. For instance, at optional step 310 the processing system may sweep a receive beam of the receiver device via the first plurality of receive beam directions by setting a voltage and phase driving each antenna element of an antenna array according to a look up table where each entry corresponds to a receiver beam index. The first plurality of receive beam directions may comprise all or a portion of the possible receive beam directions that may be achieved via the components of the receiver device. Alternatively, or in addition, the capturing of the first measurement of the performance indicator at step 320 may comprise capturing, at the first position, a first plurality of measurements of a plurality of performance indicators. For instance, measurements of a plurality of different types of performance indicators may be captured for one or more receive beam directions, where the different types of performance indicators may include at least two of: a received signal strength, a bit error rate, a packet loss rate, a round trip time, a delay measure, a beam failure event, a radio link interruption event, a random access procedure failure event, or the like.

At optional step 330, the processing system may record an identifier of the first location. For instance, a user may input a name or other identifiers to describe the location, such as: "kitchen," "office," "bedroom 1," "bedroom 2," "bedroom 3," "master bedroom," "family room," "cubicle 12," etc. The identifier may be recorded via a keyboard or keypad, a touch-sensitive display screen, an audio input via a microphone, and so forth.

At optional step 340, the processing system may receive at least a second wireless signal from the base station of the beamformed wireless communication network. Optional step 340 may comprise the same or similar operations as described above in connection with optional step 310. However, optional step 340 may involve the receiver device being deployed at a second position, e.g., having a different location and/or a different spatial orientation than the first position associated with optional step 310, step 320, and optional step 330.

At step 350, the processing system captures, at the second position comprising a second location and a second spatial orientation of the device, a second measurement of a performance indicator based upon at least a second wireless signal from the base station of the beamformed wireless communication network. Step 350 may comprise the same or similar operations as described above in connection with step 320. It should be noted that the second position may involve the same location, but a different orientation of the receiver device. For example, the receiver device may include a directional antenna that can beam steer over 60 degrees in azimuth. Thus, step 320 may relate to a first 60 degree sector. However, to determine whether other possible orientations outside of this 60 degree sector may be viable for a fixed wireless broadband (FWB) deployment at the same location, the receiver device may be turned so that at least a second measurement of the performance indicator may be captured in a different 60 degree sector in azimuth.

As described above, in one example, step 320 may include capturing, at the first position, a first plurality of measurements of the performance indicator with respect to a first plurality of receive beam directions. In such an example, step 350 may comprise capturing, at the second position, a second plurality of measurements of the performance indicator with respect to a second plurality of receive beam directions. As also described above, in one example, step 320 may include capturing, at the first position, a first plurality of measurements of a plurality of performance indicators. In such an example, step 350 may include capturing, at the second position, a second plurality of measurements of the plurality of performance indicators. In addition, the second measurement of the performance indicator may be associated with a second receive beam direction of the receiver device. In one example, the processing system may translate the spatial orientation of the second receive beam direction from a local coordinate system to a spatial orientation in a global coordinate system. The translation may be based upon the difference between a local orientation and the global orientation, which can be estimated using the gyroscope and compass of the receiver device.

At optional step 360, the processing system may record an identifier of the second location. In one example, optional step 360 may comprise the same or similar operations as described above in connection with optional step 330. For instance, in one example, the second location may be different from the first location. Hence, a user may provide a second label to identify the second location, which may be recorded at optional step 360.

At step 370, the processing system selects a position for a deployment of the device based upon the first measurement of the performance indicator and the second measurement of the performance indicator. The position that is selected may comprise, for example: the first location and the first spatial orientation, the second location and the second spatial orientation, the first location and a third spatial orientation that is different from the first spatial orientation, or the second location and a fourth spatial orientation that is different from the second spatial orientation. In one example, the first and second spatial orientations could be the same and/or the third and fourth orientations could be the same. In another example, the first location and the second location could be the same, but with the first and second spatial orientations being different.

For instance, in one example, the (optimal/preferred/recommended) position is calculated by comparing the measurements of steps 320 and 350 in a global coordinate system. In one example, the position is determined by selecting the location corresponding to the largest received power for any receive beam direction, and by selecting a spatial orientation with the boresight of the receiver device's antenna array(s) aligned with the spatial orientation of the receive beam direction which is determined to have the largest received power. In another example, the position is determined by choosing the location corresponding to the largest number of receiver beam directions having measurements of the performance indicator meeting a threshold criteria (e.g., above or below a predefined or pre-configured threshold, or above or below a relative threshold, depending upon the particular type of performance indicator). In one example, step 370 may account for measurements regarding a plurality of performance indicators according to a formula.

At step 380, the processing system provides at least one instruction for the deployment of the device at the position that is selected. For instance, the position that is selected may comprise the first location or the second location (as well as a spatial orientation). In one example, the at least one instruction is provided via a visual or audio output of the device. In addition, in one example, the at least one instruction may include the identifier of the first location or the identifier of the second location that may be recorded at optional steps 330 and 360. In one example, the at least one instruction further includes at least one command for a spatial orientation of the device. In one example, the at least one instruction comprises a plurality of instructions, which may include commands to change at least one of a location of the device with respect to a current location of the device or a spatial orientation of the device with respect to a current spatial orientation of the device. For instance, the processing system may incrementally guide a user in correctly orienting the device, providing visual or audio feedback until the correct spatial orientation is achieved. Following step 380, the method 300 proceeds to step 395 where the method ends.

It should be noted that the method 300 may be expanded to include additional steps or may be modified to include additional operations with respect to the steps outlined above. For example, the method 300 may be repeated through various cycles of performance indicator measurements for additional locations and/or spatial orientations, and so forth. In one example, steps 320 and 350 may include capturing a plurality of measurements of a performance indicator over multiple wireless signals, capturing measurements for a plurality of performance indicators with respect to the same wireless signals or different wireless signals, and tagging the measurements with associated locations and spatial orientation information in the respective locations. In still another example, steps, functions, and/or operations of the method 300 may alternatively be performed by a network based device, such as AS 130 in FIG. 1. Thus, these and other modifications are all contemplated within the scope of the present disclosure.

In addition, although not specifically specified, one or more steps, functions, or operations of the method 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Figure 4:
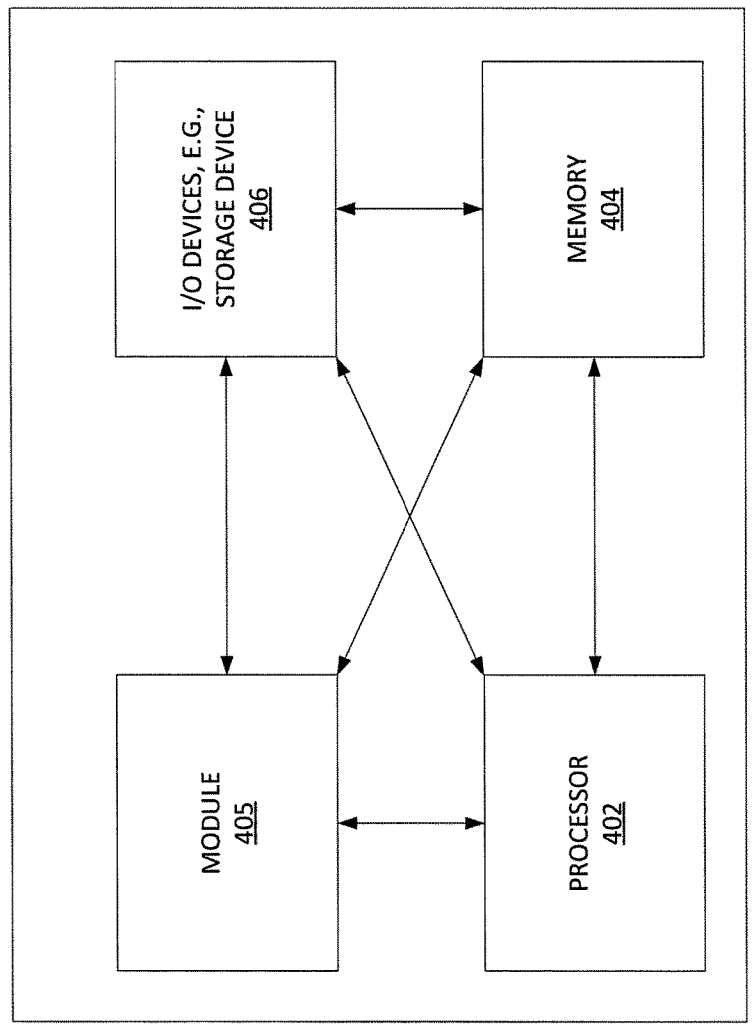
FIG. 4 illustrates an example of a computing device, or computing system, specifically programmed to perform the steps, functions, blocks, and/or operations described herein.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for selecting a position for a deployment of a device in a beamformed wireless communication network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, antenna arrays, remote radio heads (RRHs), baseband units (BBUs), transceivers, power units, and so forth. Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for selecting a position for a deployment of a device in a beamformed wireless communication network (e.g., a software program comprising computer-executable instructions) can be loaded into memory 404 and executed by hardware processor element 402 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for selecting a position for a deployment of a device in a beamformed wireless communication network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A device comprising:
   a processing system including at least one processor; and
   a computer-readable medium storing instructions which, when executed by the processing system, cause the processing system to perform operations, the operations comprising:

capturing, at a first position comprising a first location and a first spatial orientation of the device, a first measurement of a performance indicator based upon at least a first wireless signal from a base station of a beamformed wireless communication network;

capturing, at a second position comprising a second location and a second spatial orientation of the device, a second measurement of the performance indicator based upon at least a second wireless signal from the base station of the beamformed wireless communication network;

selecting a position for a deployment of the device based upon the first measurement of the performance indicator and the second measurement of the performance indicator; and providing at least one instruction for the deployment of the device at the position that is selected.

2. The device of claim 1, wherein the operations further comprise:

receiving the at least the first wireless signal from the base station of the beamformed wireless communication network; and receiving the at least the second wireless signal from the base station of the beamformed wireless communication network.

3. The device of claim 1, wherein the position that is selected comprises one of:

the first location and the first spatial orientation; or
the second location and the second spatial orientation.

4. The device of claim 1, wherein the position that is selected comprises one of:

the first location and a third spatial orientation that is different from the first spatial orientation; or
the second location and a fourth spatial orientation that is different from the second spatial orientation.

5. The device of claim 1, wherein the position that is selected comprises one of:

a location corresponding to a largest measurement of the performance indicator for any receive beam direction; or
a location corresponding to a largest number of receive beam directions having measurements of the performance indicator meeting a threshold criterion.

6. The device of claim 1, wherein the capturing the first measurement of the performance indicator comprises capturing, at the first position, a first plurality of measurements of the performance indicator with respect to a first plurality of receive beam directions, and wherein the capturing the second measurement of the performance indicator comprises capturing, at the second position, a second plurality of measurements of the performance indicator with respect to a second plurality of receive beam directions.

7. The device of claim 1, wherein the capturing the first measurement of the performance indicator comprises capturing, at the first position, a first plurality of measurements of a plurality of performance indicators, and wherein the capturing the second measurement of the performance indicator comprises capturing, at the second position, a second plurality of measurements of the plurality of performance indicators.

8. The device of claim 1, wherein the performance indicator comprises:

a received signal strength;
a bit error rate;
a packet loss rate;
a round trip time;
a delay measure;
a beam failure event;
a radio link interruption event; or
a random access procedure failure event.

9. The device of claim 8, wherein the received signal strength comprises a reference signal received power.

10. The device of claim 1, wherein the first location and the second location are determined based upon a global positioning system receiver of the device.

11. The device of claim 1, wherein first location and the second location are determined based upon time of arrival measurements at the device.

12. The device of claim 1, wherein the first measurement of the performance indicator is associated with a first receive beam direction of the device, and wherein the second measurement of the performance indicator is associated with a second receive beam direction of the device.

13. The device of claim 12, wherein the first receive beam direction and the second receive beam direction are determined via voltages and phases in a receiver circuitry associated with antenna elements of a phased antenna array of the device.

14. The device of claim 13, wherein the first receive beam direction and the second receive beam direction are further determined via a gyroscope and compass of the device.

15. The device of claim 1, wherein the operations further comprise:

recording an identifier of the first location; and
recording an identifier of the second location.

16. The device of claim 15, wherein the position that is selected comprises the first location or the second location, wherein the at least one instruction is provided via a visual output of the device or an audio output of the device, and wherein the at least one instruction includes the identifier of the first location or the identifier of the second location.

17. The device of claim 16, wherein the at least one instruction further includes at least one command for a spatial orientation of the device.

18. The device of claim 17, wherein the at least one instruction comprises a plurality of instructions, wherein the plurality of instructions includes commands to change at least one of a location of the device or a spatial orientation of the device.

19. A non-transitory computer-readable medium storing instructions which, when executed by a processing system of a device including at least one processor, cause the processing system to perform operations, the operations comprising:

capturing, at a first position comprising a first location and a first spatial orientation of the device, a first measurement of a performance indicator based upon at least a first wireless signal from a base station of a beamformed wireless communication network;

capturing, at a second position comprising a second location and a second spatial orientation of the device, a second measurement of the performance indicator based upon at least a second wireless signal from the base station of the beamformed wireless communication network;

selecting a position for a deployment of the device based upon the first measurement of the performance indicator and the second measurement of the performance indicator; and providing at least one instruction for the deployment of the device at the position that is selected.

20. A method, comprising:

capturing, by a processing system of a device including at least one processor, at a first position comprising a first location and a first spatial orientation of the device, a first measurement of a performance indicator based upon at least a first wireless signal from a base station of a beamformed wireless communication network;

capturing, by the processing system at a second position comprising a second location and a second spatial orientation of the device, a second measurement of the performance indicator based upon at least a second wireless signal from the base station of the beamformed wireless communication network;

selecting, by the processing system, a position for a deployment of the device based upon the first measurement of the performance indicator and the second measurement of the performance indicator; and providing, by the processing system, at least one instruction for the deployment of the device at the position that is selected.

* * * * *